2,905,691
NEW VAT DYESTUFFS OF THE ANTHRAQUINONE SERIES

Willy Braun, Heidelberg, and Wilhelm Ruppel, Mannheim-Kaefertal, Germany, assignors to Badische Anilin- & Soda-Fabrik Aktiengesellschaft, Rhineland-Pfalz, Germany No Drawing. Application January 28, 1958
Serial No. 711,569

Claims priority, application Germany April 26, 1957

6 Claims. (Cl. 260—307.5)

This invention relates to a process for the production of vat dyestuffs of the anthraquinone series and to new vat dyestuffs of the anthraquinone series.

In the U.S. patent specifications Nos. 2,147,569 and 2,244,655 there is described, inter alia, the production of 1.4-diamino-2-anthraquinonyl-anthraquinone-oxazoles in which the 4-position amino group is acylated in different ways. These compounds, when the amino group is acylated by benzoic acid, monohalogenbenzoic acids or trifluoromethylbenzoic acids, are blue vat dyestuffs fast to chlorine which however cannot be discharged pure white.

It is therefore the object of this invention to find new blue vat dyestuffs fast to chlorine which can be discharged pure white.

We have now found that vat dyestuffs of this series which can be discharged white and moreover are faster can be prepared by acylating a 1.4-diamino-2-anthraquinonyl-anthraquinone-oxazole of the general formula

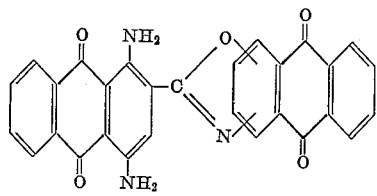

I with a reactable compound containing the group —CO.A in which A is a phenyl radical bearing at least two halogen atoms selected from the group consisting of polyhalogenbenzoic acids, polyhalogenbenzoic acid halides and polyhalogenbenzoic acid anhydrides.

As 1.4-diamino-2-anthraquinonyl-anthraquinone-oxazoles of the formula I there may be mentioned for example 1.4-diamino-2-anthraquinonyl-2'.3'-anthraquinone-oxazole and 1.4-diamino-2-anthraquinonyl-1'(N).2'-anthraquinone-oxazole, and as reactive compounds which contain the group —CO.A in which A is a phenyl radical bearing at least two halogen atoms there may be mentioned carboxylic acids, carboxylic acid anhydrides and carboxylic acid chlorides in which A represents the radical of a di-, tri-, tetra- or penta-halogenbenzene, such as a chloro-, bromo- or chlorobromobenzene, for example a dichlorobenzene, a dibromobenzene, a monochloromonobromobenzene, a trichlorobenzene, a dichloro-monobromobenzene, a tetrachlorobenzene or a pentachlorobenzene.

The new dyestuffs of the formula

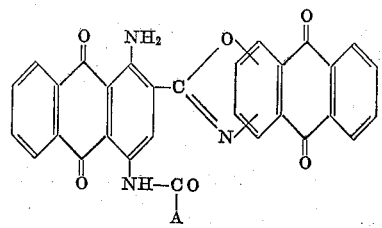

II in which A is a penyl radical bearing at least two halogen atoms are distinguished from the known dyestuffs not only by their white dischargeability but also by a displacement of the shade of color towards violet which is very desirable tinctorially and also by considerably better wet fastness.

For the production of the new dyestuffs, for example, the acid chloride of a polyhalogenbenzoic acid may be allowed to act on a suspension of a 1.4-diamino-2-anthraquinonyl-anthraquinone-oxazole in an organic solvent, such as nitrobenzene, at temperatures of about 120° to 220° C., advantageously about 140° to 180° C., or the polyhalogenbenzoic acid is brought to reaction together with the anthraquinone-oxazole and the amount of thionyl chloride necessary for the conversion of the carboxylic acid into the acid chloride. In this way the preparation of the acid chloride is combined with the acylation of the 1.4-diamino-2-anthraquinonyl-anthraquinone-oxazole.

The following polyhalogenbenzoic acids and/or their halides or anhydrides are for example suitable for the preparation of the new dyestuffs: 2.5-dichlorobenzoic acid, 2.5-dibromobenzoic acid, 3.4-dichlorobenzoic acid, 2-chlor-5-bromobenzoic acid, 2.4-dichlorobenzoic acid, 2.4.5-trichlorobenzoic acid, 2.5.4-dichlorobromobenzoic acid and also tetra- chloro- or pentachloro-benzoic acids.

The new dyestuffs can be used for coloring cellulose fibers, such as cotton and rayon.

The following examples will further illustrate this invention but the invention is not restricted to these examples. The parts specified in the examples are parts by weight.

Example 1

100 parts of 1.4-diamino-2-anthraquinonyl-2'.3'-anthraquinone-oxazole are heated to 120° C. in 1000 parts of nitrobenzene; then 54 parts of 2.5-dichlorobenzoyl chloride are introduced and 6 parts of pyridine added. The mixture is then heated while stirring well for 5 hours at 145° to 150° C. and another hour at 180° C. After cooling to 100° C. it is filtered by suction, covered with warm nitrobenzene and the filter cake freed from nitrobenzene by steam distillation. After drying there are obtained about 110 parts of a violet vat dyestuff. The dyeings prepared with the dyestuff in the usual way are completely fast to chlorine, have very good wet fastness and may be discharged pure white.

A very similar dyestuff is obtained by using 2.5-dibromobenzoic acid chloride for the acylation.

Example 2

By using the same amount of 3.4-dichlorobenzoyl chloride instead of the 2.5-dichlorobenzoyl chloride used in Example 1 there is obtained in the same yield a vat dyestuff which goes onto cotton in very reddish blue shades; it has the same valuable fastness properties and may also be discharged pure white.

The 3.4-dichlorobenzoyl chloride may also be replaced by 94 parts of 3.4-dichlorobenzoic acid anhydride.

Example 3

10 parts of 1.4-diamino-2-anthraquinonyl-2'.3'-anthraquinone-oxazole, 6 parts of 3.4-dichlorobenzoic acid, 0.6 part of pyridine and 5 parts of thionyl chloride are introduced into 100 parts of nitrobenzene. It is then heated for 3 hours at 100° C., one hour at 120° C., 3 hours at 145° to 150° C. and another hour at 180° C. It is then allowed to cool, filtered by suction at 120° C., covered with hot nitrobenzene, washed with benzene and dried. About 11.5 parts of a dyestuff are obtained which agrees with that obtainable according to Example 2.

Example 4

100 parts of 1.4-diamino-2-anthraquinonyl-2'.3'-anthraquinone-oxazole are heated with 1,000 parts of nitrobenzene at 120° C. Then 65 parts of 2.5-chlorobromobenzoyl chloride are introduced and 6 parts of pyridine added. The mixture is heated while stirring well for 5 hours at 145° to 150° C. and for another hour at 180° C. After cooling to 100° C., it is worked up as in Example 1. A blue violet vat dyestuff with the same valuable properties as that obtained according to Example 1 is obtained.

Example 5

100 parts of 1.4-diamino-2-anthraquinonyl-2'.3'-anthraquinone-oxazole are heated with 1,000 parts of nitrobenzene to 120° C. Then 54 parts of 2.4-dichlorobenzoyl chloride and 6 parts of pyridine are introduced. The mixture is heated while stirring for four hours at 145° to 150° C., and then for another hour at 180° C. After cooling to 100° C. it is filtered by suction and the dyestuff recovered as in Example 1. There is similarly obtained a violet vat dyestuff which is very similar in its properties to the dyestuff described in Example 1.

Example 6

100 parts of 1.4-diamino-2-anthraquinonyl-2'.3'-anthraquinone-oxazole are heated with 1,200 parts of nitrobenzene to 120° C. Then 68 parts of 2.4.5-trichlorobenzoyl chloride are introduced, 6 parts of pyridine added and the mixture heated while stirring well for 5 hours at 145° to 150° C. and then for another hour at 180° C. After cooling to 100° C. it is filtered by suction and worked up as in Example 1. A violet vat dyestuff is obtained which is very similar to that described in Example 1 and has the same valuable properties.

A very similar dyestuff is formed by using the equivalent amount of 2.5.4-dichlorobromobenzoyl chloride as acylating agent.

Example 7

100 parts of 1.4-diamino-2-anthraquinonyl-1'(N).2'-oxazole are heated in 1,000 parts of nitrobenzene to 120° C. Then 60 parts of 2.5-dichlorobenzoyl chloride are introduced and the mixture heated with powerful stirring for 4 hours at 145° to 150° C. and another 2 hours at 180° C. After cooling to 100° C., the dyestuff formed is filtered off by suction, washed with a little hot nitrobenzene, freed by steam distillation from adherent nitrobenzene and dried. About 120 parts of a reddish blue vat dyestuff are obtained which has the same valuable properties as the dyestuffs described in the foregoing examples.

A very similar dyestuff is obtained by using 2.4.5-trichlorbenzoyl chloride for the acylation.

What we claim is:

1. A process for the production of vat dyestuffs of the anthraquinone series which comprises acylating a 1.4-diamino-2-anthraquinonyl-anthraquinone-oxazole of the general Formula I

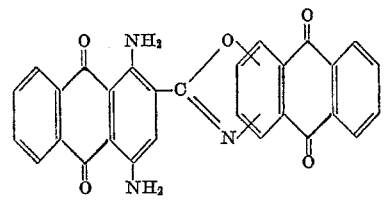

with a reactive compound which contains the group —CO.A in which A represents a phenyl radical bearing at least two halogen atoms and selected from the group consisting of polyhalogenbenzoic acids, polyhalogenbenzoic acid halides and polyhalogenbenzoic acid anhydrides.

2. A vat dyestuff of the general Formula II

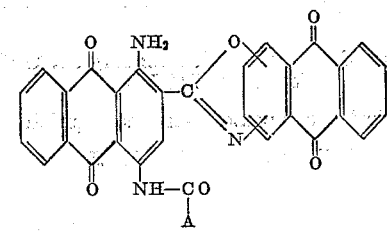

in which A is a phenyl radical bearing at least two halogen atoms.

3. A vat dyestuff of the general formula

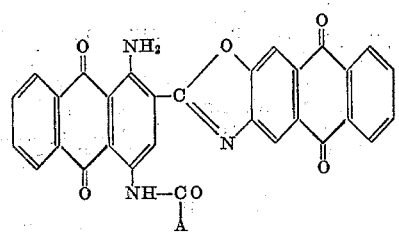

in which A is a phenyl radical containing at least two halogen atoms.

4. The vat dyestuff of the formula

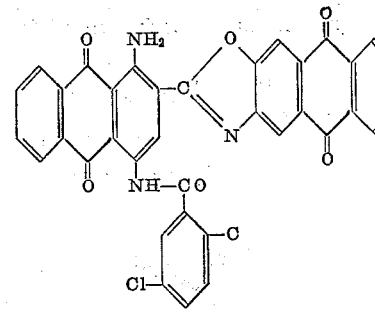

5. The vat dyestuff of the formula

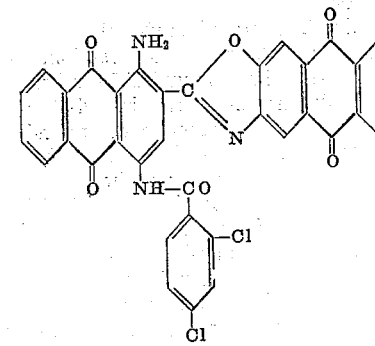

6. The vat dyestuff of the formula
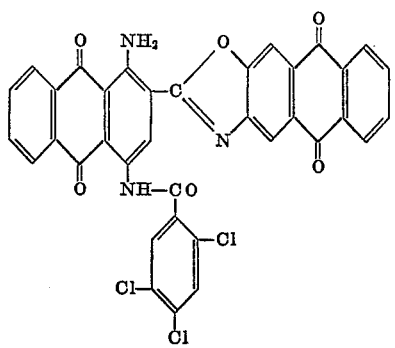
References Cited in the file of this patent
UNITED STATES PATENTS
| | | | |
|---|---|---|---|
| 2,147,569 | Berthold et al. | | Feb. 14, 1939 |
| 2,807,622 | Holbro et al. | | Sept. 24, 1957 |
FOREIGN PATENTS
| 626,550 | Germany | | Feb. 28, 1936 |

UNITED STATES PATENT OFFICE

Certificate of Correction

Patent No. 2,905,691                                                   September 22, 1959

Willy Braun et al.

It is hereby certified that error appears in the printed specification of the above numbered patent requiring correction and that the said Letters Patent should read as corrected below.

Column 4, lines 55 to 60, claim 4, for that portion of the formula reading

Signed and sealed this 14th day of June 1960.

[SEAL]

Attest:
KARL H. AXLINE,
*Attesting Officer.*

ROBERT C. WATSON,
*Commissioner of Patents.*